INVENTOR.
Otto V. Drtina
BY

May 11, 1965 O. V. DRTINA 3,182,644
INTERNAL COMBUSTION ENGINE
Filed July 24, 1961 6 Sheets-Sheet 6

INVENTOR.
Otto V. Drtina

United States Patent Office 3,182,644
Patented May 11, 1965

3,182,644
INTERNAL COMBUSTION ENGINE
Otto V. Drtina, Cleveland, Ohio
(1052 Kenneth Drive, Lakewood 7, Ohio)
Filed July 24, 1961, Ser. No. 128,338
2 Claims. (Cl. 123—58)

This application Ser. No. 128,338 of July 24, 1961, is a continuation in part of my copending applications Ser. No. 675,712 filed August 1, 1957, and Ser. No. 29,441 filed May 16, 1960, both of them now abandoned.

The present invention relates to self-reciprocating piston engines of the two-stroke per cycle principle. More particularly, the invention refers to an internal combustion engine having no valves and working on a uniflow efficient scavenging principle, which provides effective inner air-cooling of pistons and improved seals of scavenging and combustion spaces, and having means to transmit reciprocating motion of pistons to rotary thru a novel type of a wobbling-mechanism.

Free piston and other engines which use opposed differential pistons in various arrangements are already known. Although the free piston engines are based on a simple principle, they are complicated now, because of a number of difficulties which had to be overcome; for example, in interlocking the movements of the pistons and in the provision of means to drive the magnetos or injection pumps in a definite relationship with respect to the position of the pistons.

This arrangement is, in fact, related to free piston engines, as it describes a single unit of self-reciprocating piston, where the energy produced thru combustion is transmitted to rotary power as a result of counteracting forces from precompression and compression.

Uncommon terms used:

The term "piston-spool" used later thereon means a unit of two pistons with small diameter pass-over tubes joined together thru some sort of a piston-coupler, to form one rigid unit, able to reciprocate in a cylinder enclosure.

The term "self-reciprocating piston" relates to such an arrangement, enabling the piston unit to reciprocate freely by its own power without need of mechanical means to move it thru the non-productive cycles.

"Wobbling mechanism" refers to new means to transmit reciprocating movements of piston-spool to rotary.

"Uniflow" principle means that air and gases move one way with no turn back.

"Scavenging exchange": Scavenging pump is supposed to provide scavenging air in sufficient volume and pressure to drive out residual gases from the combustion chamber and the combustion space after the combustion cycle has been completed.

"Precompression ratio" is a ratio of remaining volume of scavenging space at the end of precompression stroke to the whole scavenging side volume when piston reaches other dead center.

To eliminate all the difficulties and drawbacks of various solutions employed in the prior art, a combination of piston-spool and wobble-mechanism, acting on pass-over tube was here developed, which arrangement renders new effects and additional advantages as disclosed hereafter in the objects of this invention:

(1) Couple of pistons in form of self-reciprocating piston-spool with means for transmitting reciprocating motion to rotary, acting in center of gravity of said spool on the pass-over tube ends, enabling a formation of compact scavenging space.

(2) Universal joint and coupler to unite both pistons into a spool thru their pass-over tubes of relatively small diameter, equal to suction manifold area. Pass-over tubes are well guided to prevent binding; also, reciprocating masses are kept down to minimum.

(3) Wobble-arm mounted on antifriction bearings having extended studs, which act on centrally located universal joint of the pass-over tubes; tandem arrangement renders counterbalanced and foolproof run without stalling at low speeds.

(4) Inwardly acting seal rings of pass-over tubes with easily replaceable segments without the need of dismantling of the whole engine, which makes exchange of same easy.

(5) Stationary seal-rings holder inside of pass-over tubes and the scavenging space enclosing lid following the shape of piston (which up to this time was not feasible), thus rendering a high degree of volumetrically efficient scavenging.

(6) Combustion chamber with its spiral-loop scavenging accomplished without any operating mechanism is achieved in a most simple way.

(7) Device for adjusting the location of piston-spools in regard to cylinder-enclosure, for equal compression ratio on both sides.

(8) Swiveling studs on clevises adopted on wobble-mechanism enable barrel form arrangement of a barrel form of engine.

(9) An air filter with circulating lubrication of all moving engine parts, preventing oil-mist from entering the combustion space.

(10) An inner cooling of the piston pass-over tubes.

(11) A nonharmonic exhaust muffler-silencer.

Other objects and advantages will become apparent and the invention may be better understood by reference to the following description taken in connection with the accompanying drawings, in which.

Figures 1, 2:
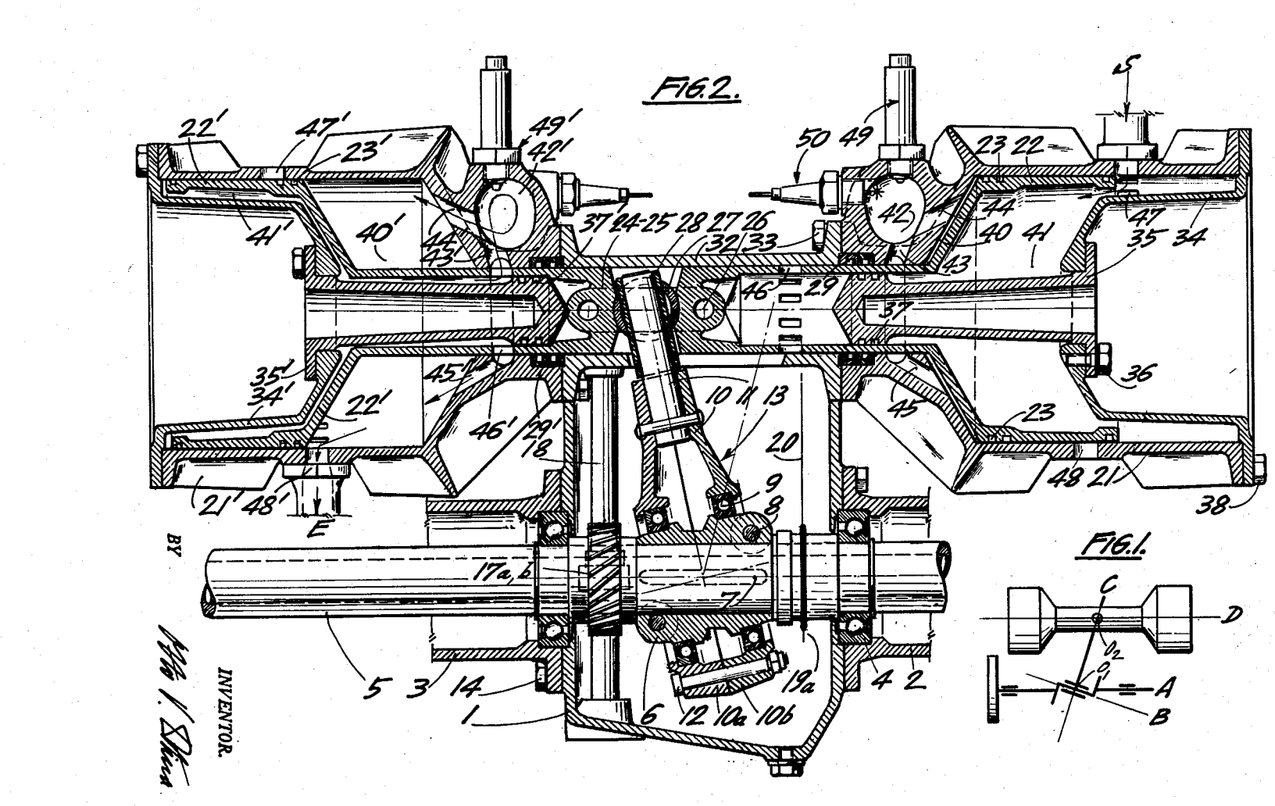
FIG. 1 shows schematically the basic principle of this invention.
FIG. 2 is a front elevation in section, showing an engine having the piston-spool shown in the far left position.

A worthy feature of a piston-spool engine as herein described is that the mechanism for transmitting reciprocating motion of spool to rotary is under reduced load from counteracting forces of combustion against compression, precompression and suction on the spool, making possible a lighter-weight mechanism, having less vibration and rendering longer wear. The basic part of this invention is in a piston-spool as shown in FIG. 1 with a universal joint arranged in the middle of a pass-over tube into which engages an extended wobbling stud of a wobbling-arm, arranged on inclined main shaft journal B, which, when rotating around axis A, causes a wobbling effect on said wobbling mechanism, which in turn is used to transmit the back and forth motion into rotary. Shown in one plane, axes A and B and C, all meet in one point $o_1$ and axes C and D in point $o_2$.

Referring to FIG. 2, a self-reciprocating, one piston-spool engine is shown, using a combination of said spool with a wobbling mechanism set in bottom part of engine housing 1, which is to be considered also as a wobble-mechanism housing. The engine housing is located in middle between the cylinders and is serving mainly to accommodate the wobbling mechanism with the main shaft assembly 5 going thru, and to carry funnel-shaped cylinders 21, 21' on each side attached thereto in top part of same in center-line of the main bore for the pass-over tube; this bearing is split to be able to set-in the piston-spool assembly and is provided with tight cover 32.

All said component parts (main engine housing with top cover, cylinders and the front and rear tubular extensions 2 and 3) (one to the flywheel and the other to cooling fan) form one rigid unit, mounted in the frame of the vehicle. The cylinder blocks 21, 21' of a funnel-shape, are provided each with mounting flanges on both sides and have inlet ports 47, 47', outlet ports 48, 48' both located intermediate the ends thereof, and pass-over passages 45, 45', communicating from a groove in each small diameter bore with the respective cylinder and these cylinders are provided with compact spherical combustion chambers 42, 42', each located adjacent a small diameter bore.

*Piston-spools.*—Inside the cylinder enclosure, there is a self-reciprocating piston assembly on relatively small diameter pass-over tube called a piston-spool 26; it consists of two identical halves, having the larger hollow diameter part serving in its function as a piston, and a partly hollow small diameter portion called a pass-over tube, integral with the piston body, resembling a funnel; those two parts with pass-over ports 46, located in proximity of end of pass-over tube bore are coupled with small diameter ends together thru a coupler as will be described later in the following. The pass-over tube equals the inlet suction manifold in area and requires a compact and sturdy coupler, built in a unit with the universal joint.

Figure 3:
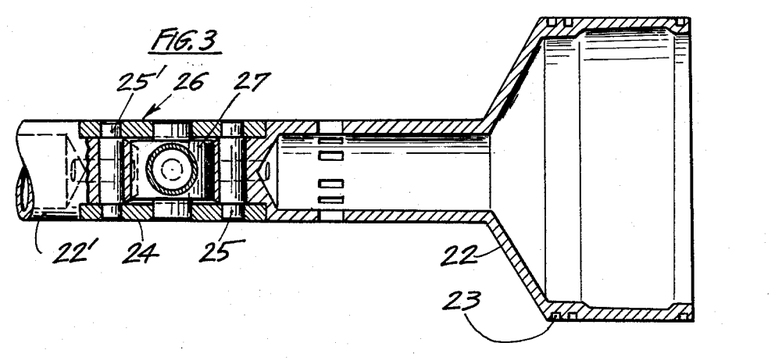
FIGS. 3, 4 and 5 show front elevation, plan view and cross-section of a piston-spool with the splicing link-bars and the centrally located universal joint.
Figure 4:
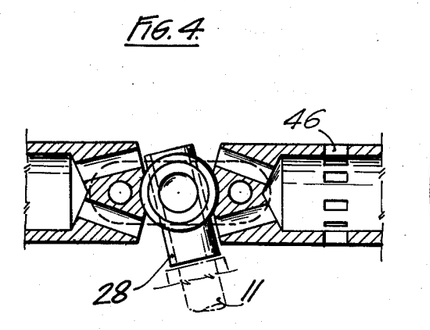
Figure 5:
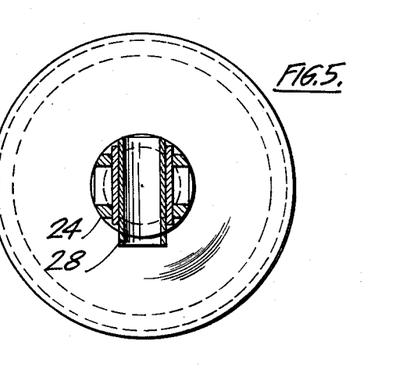

The piston coupler assembly, as FIGS. 3, 4 and 5 show, unites a couple of pistons 22, 22' provided on their pass-over tube ends with milled off portions and bores to accommodate a couple of splicing link-bars 24, with adjoining pressed-in link dowel-pins 25, 25'. The small diameter ends of each pass-over tube have one more circular cutouts, to accommodate the centrally located universal joint body 27 with two integral end-journals extending into link-bars 24. An oscillating bushing 28 is pressed into said universal joint body to facilitate sliding back and forth and turning of a wobbling stud 11, which is firmly attached to a wobbling arm.

Reciprocating masses must be of light weight. This requirement applies first of all to piston-spool. In most previous designs, the pass-over tubes are in one piece and pistons are attached to each end; this way it is necessary to make the union rigid enough and that means increase in weight; besides, the union must never get loose. In my case, I make pistons with pass-over extension in one piece coupled together in the middle; instead of two unions, only one in center is made and so weight is reduced and nothing can ever get loose.

*The combustion spaces.*—When the already described piston-spool is assembled together with related cylinder-blocks, and set as a unit into top split bore for the pass-over tube of the main engine housing, and cover 32 secured to said housing, including both cylinder-blocks, then the spaces formed between large diameter pistons and corresponding one-piece cylinder enclosure adjacent to pass-over tube bore, are the combustion spaces 40, 40'.

*Wobbling mechanism.*—In general, as shown in FIG. 1, it is able to move steadily from side to side and has its wobbling hub rotatably mounted on an askew journal of the main shaft, said wobbling hub is provided with radially extended arm ended with stud engaging with universal joint and coupler of a piston-spool and providing the reciprocating motion of same.

A wobbling mechanism 13 used on engine as shown in FIG. 2, is comprised of a hub 6 rigidly mounted on main shaft 5, which hub is of the inclined pin type, having its axis intersecting the axis of main shaft at the point where wobbling-stud axis intersects the axis of the main shaft; the wobbling hub with arm 10 in one piece, is rotatably mounted on askew journal of rigid hub thru antifriction bearings 9, to ensure easy run. Said wobbling arm 10 has a radially extended stud 11, which engages the oscillating bushing 28 of a universal joint and coupler of the piston-spool unit 26. The wobbling mechanism mounted on main shaft is set in an air-tight wobble-mechanism housing on bearings 4; top part of same housing accommodates the pass-over tubes of the piston-spool assembly, with the universal joint in its split bore, which is provided with demountable cover 32, for accessibility in servicing the inwardly acting piston rings 29. The top bore with related cover 32 serves as bearing for the piston-spool, to take-up all forces coming from the wobbling mechanism when transmitting full power, thus preventing the cylinders and pistons from wearing out into oval shape, which cannot be sealed well.

*Operation.*—The moving force is the pressure of combustion gases, acting on spool; its back and forth linear motion is transmitted thru the centrally arranged coupler and universal joint to the stud of the wobbling arm and transmitted to rotary motion of the engine main shaft, which is provided with a flywheel; energy of this brings the wobble mechanism thru dead centers.

Figure 8:
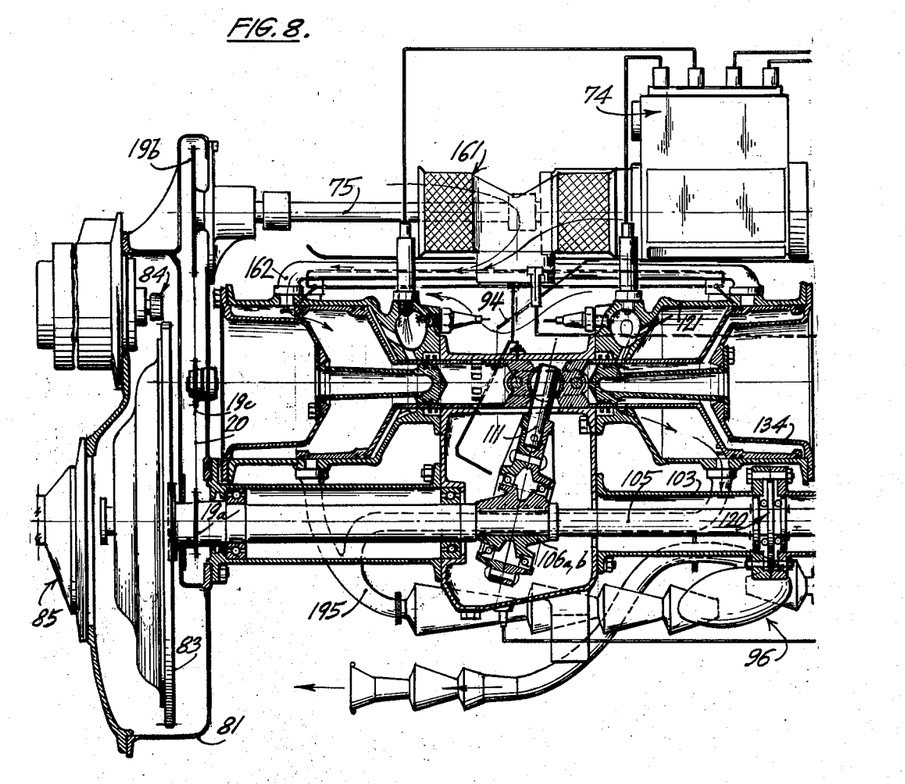
FIGS. 8 and 8a, together, show a longitudinal section of an engine with two piston-spools acting oppositely on two wobble-arms.
Figure 8A:
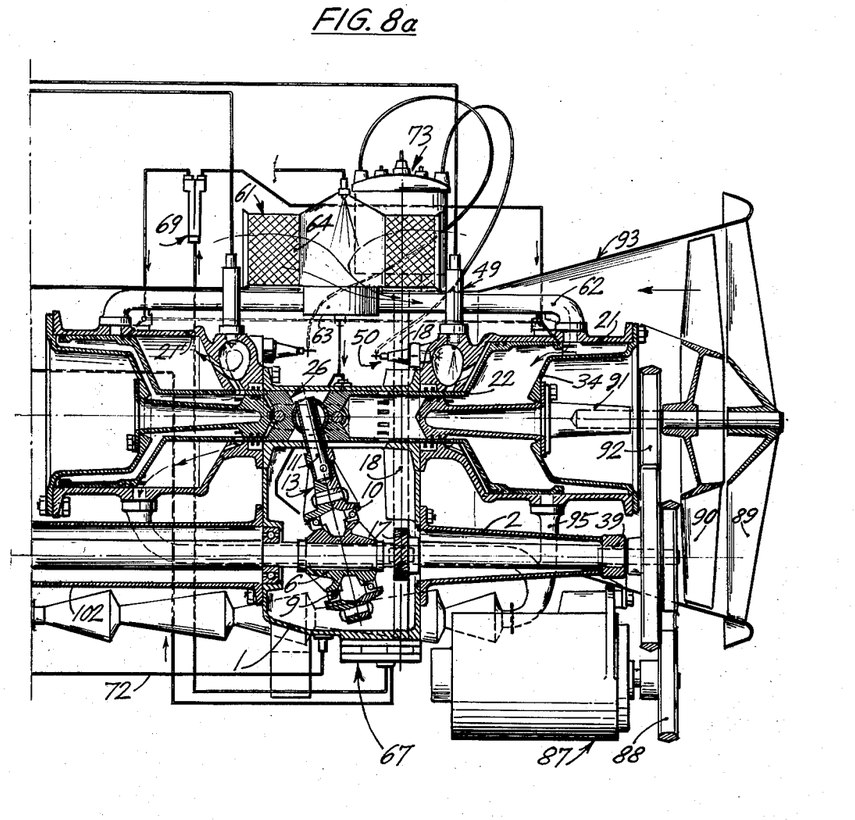
Figures 9, 10, 13:
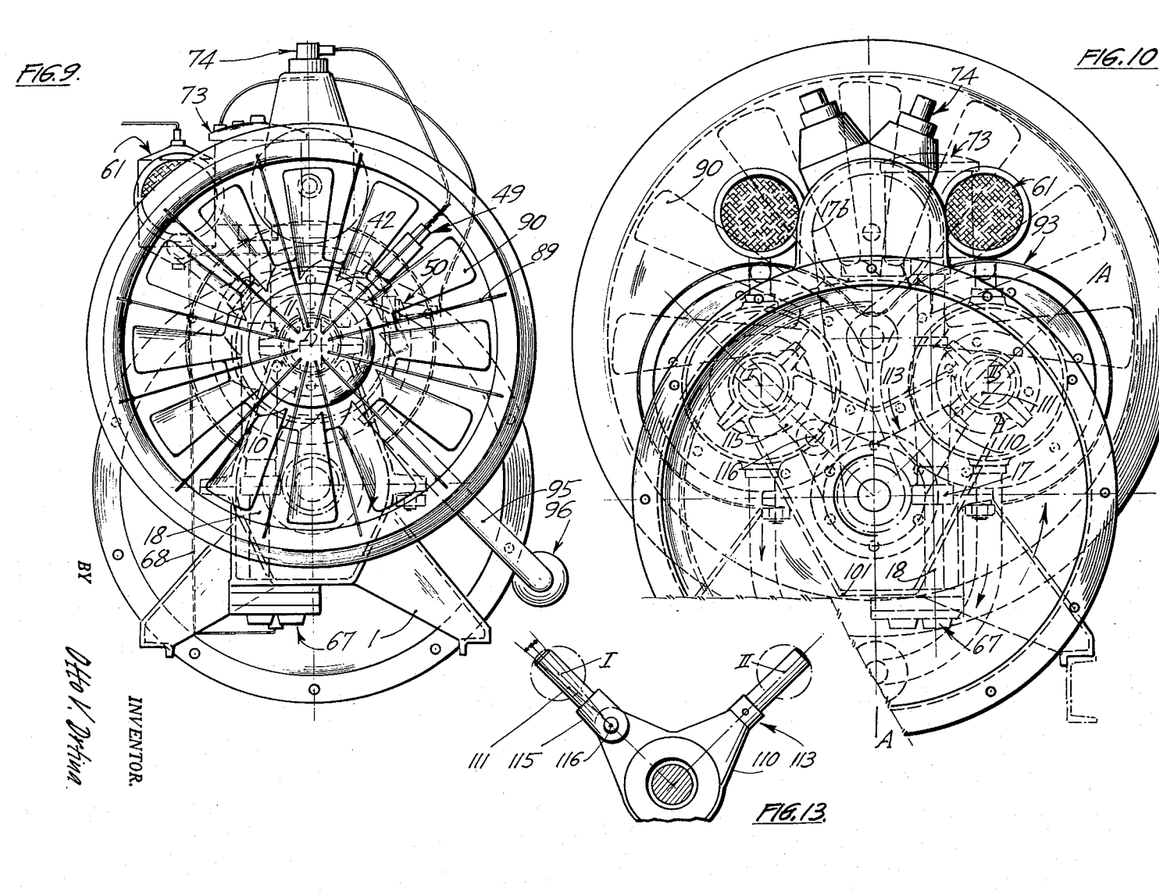
FIG. 9 is a front view of an engine shown in FIG. 8 with cylinders in tandem and also of the one shown in FIG. 2.
FIG. 10 shows a rear view of engine shown in FIG. 8, but provided with two rows (or banks) of cylinders I and II.
FIG. 13 is a wobble mechanism with 2 arms for a V-engine shown on FIG. 10.
Figures 11, 12:
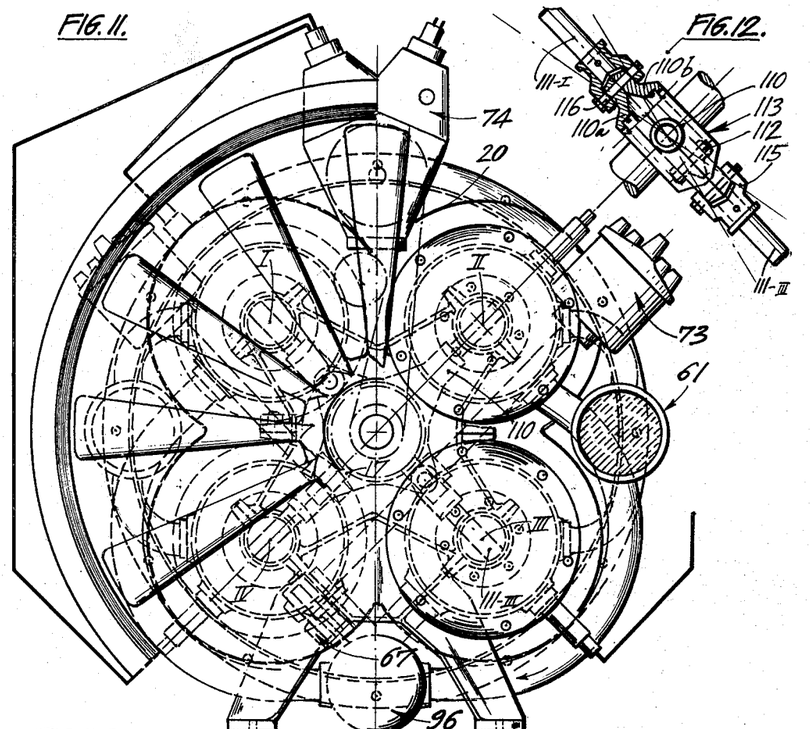
FIG. 11 is a front view of the arrangement shown in FIG. 8 but developed into a barrel form with four banks of piston-spools I, II, III and IV, thus rendering an eight-spool engine.
FIG. 12 shows a wobble-mechanism with four arms (spokes)—two rigid and two on swiveling clevises for a barrel engine of FIG. 11.

*Applications.*—Simplest method is a one-spool engine of FIG. 2 already described, or with two spools arranged in tandem as shown in FIG. 8, where one hub 6 is advanced in relation to the other 180°; more difficult is a V-engine of FIG. 10, where two spools are arranged in V-form under 90° (or two tandem spools in V-form) and most difficult application is for a barrel engine as shown in FIG. 11, with wobbling hub having four radially extended arms (spokes); those latter two applications will be explained, when describing FIGURES 10, 11, 12 and 13.

*Compact and turbulent combustion chamber, spiral loop scavenged.*—For good performance of internal combustion engine, it is essential that the combustion chamber is cleaned of left-in gases as thoroughly as possible and further it must be turbulent to mix thoroughly injected fuel with fresh air, and compact, to obtain instantaneous combustion. In most combustion chambers it is difficult to drive out residual products of combustion; even in turbulent chambers, fuel mixed with air lacking oxygen in poorly scavenged space considerably retards the rate of combustion and lowers the M.E.P. Scavenged combustion chambers having an inlet and separate outlet passage are some improvement, but is necessary to force out all residuals from the whole space; the spiral loop scavenging of the combustion chamber according to this invention is developed to do such a thorough job.

The combustion chambers 42, 42' as shown in FIG. 2, round or oval in shape similar to an egg, are each located close to their own respective cylinder combustion space and pass-over tube.

Figure 14:
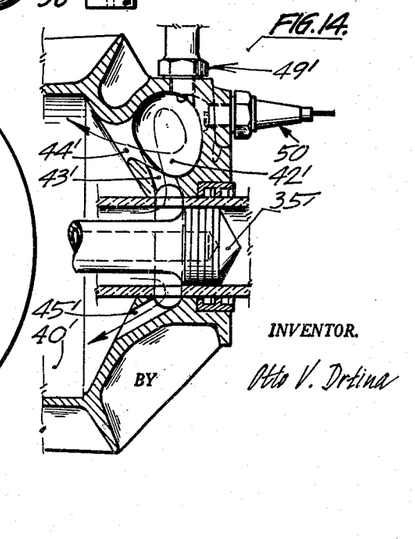
FIGS. 14 and 15 show enlarged combustion chamber with spiral-loop scavenging; and in FIG. 16, there is shown a device for adjustment of piston-spools side-ways, to equalize compressions on both sides of same.
Figure 15:
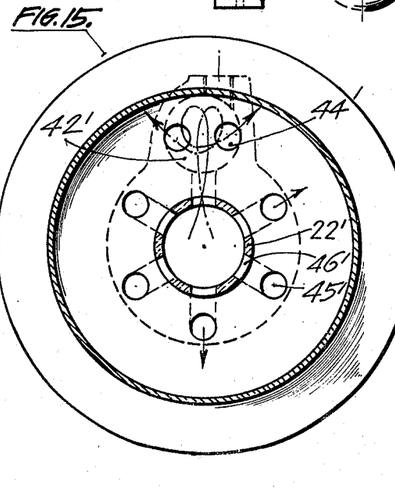

In describing same, each of the combustion chambers is provided with an inlet passage 43, 43' and two connecting passages 44, 44', into the adjacent cylinder combustion space; one of these passages is close to the small diameter portion of the adjacent piston and this may be thought of as an entry passage while the other two passages connecting into the cylinder are spaced apart. As it works, see left-hand cylinder of FIG. 2, the inrushing stream into combustion chamber flows alongside the curved wall, splits in two branches, proceeding in spiral path outward from the first and thru 44' out into combustion space; this arrangement permits driving all the residual gases out of the combustion chamber in a spiral loop as shown in enlarged FIG. 14 and FIG. 15 at which time scavenging air is allowed to rush into the combustion space thru 45', and also thru 43' and 44' which occurs when ports 46' thru the small piston diameter are allowed to communicate with the combustion space 40'.

Thereafter, at proper interval, fuel is tangentially injected thru nozzle 49 into a right-hand combustion chamber, enabling proper and turbulent mixing with the present air. At the highest point of compression the mixture is ignited, burns instantly and products of combustion enter thru passage 44 into combustion space for afterburning and exerting the resulting power on the reciprocating piston.

It is noted, that all this is accomplished by properly provided passages in and out of combustion chamber when the inlet passage coincides at the proper time with inlet port of the reciprocating pass-over tube and therefore no additional sleeves with operating means are needed.

*Scavenging exchange.*—In two-stroke per cycle internal combustion engines, a most important component is an efficient and compact scavenging pump. In order to drive out all residual gases from the combustion space including the combustion chamber, the scavenging pump must have larger cubic displacement than is that of the combustion space and be able to precompress scavenging air to a higher pressure than 4 p.s.i. as presently common, to render good scavenging job.

It may be stated that 2-cycle engines heretofore known which have internal scavenging provided by the inner side of the piston working in conjunction with a fully enclosed crankcase and thus have a common disadvantage of deficient scavenging because of the presence of an ordinary crank mechanism in the crankcase, creating dead pockets, the pressure obtained being only 4 p.s.i. at most. In most of those existing 2-cycle engines with scavenging pump built integrally with crankcase, the delivered volume of scavenging air is same (or even less, depending on tightness of seals) as is the cubic displacement of the combustion space, because the cylinder diameter and stroke of piston are same on both combustion and scavenging sides.

In prior art, some arrangements use differential pistons to obtain excess of scavenging air, which makes extra heavy reciprocating masses, and others have separate scavenging pump which delivers an excess of air, but these are expensive additions requiring additional maintenance.

The reason for the present novel piston-spool and wobble-mechanism arrangement is to make both outer ends of large diameter pistons free of any moving mechanism, so the scavenging side can be enclosed with a piston contour following lid, together with a stationary, seal-rings holding body and seals of pass-over tube, thus rendering the scavenging space with minimum of dead spaces and enabling the scavenging operation to work with the best volumetric efficiency ever attained.

As FIG. 2 is described, the right-hand cylinder is closed by a lid 34, while the left hand cylinder is closed by a lid 34'. The piston-spool assembly is guided in the central bore of main housing and reciprocates between the lids.

The spaces enclosed by those said lids are in fact the scavenging compartments 41, 41', of the scavenging pump. The lids are tightly bolted to the respective cylinders 21, 21' by means of bolts 38 and each lid 34, 34' is shaped to follow the inner contour of piston when same is closest to lid, to eliminate dead spaces, in order to get higher pressures and higher velocities of the scavenging exchange. To the inner flange of each lid is bolted a slightly tapered slim stationary body 35, 35', extending far into the bore of each pass-over tube to create contracted areas therein, so that inrushing air gains velocity for rapid cooling of the pass-over tube portion of the pistons.

Figure 6:
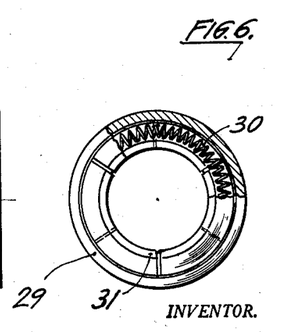
FIG. 6 is a transverse view along the line A—A of FIG. 7, showing the assembly of a single inwardly acting stationary seal ring.
Figure 7:
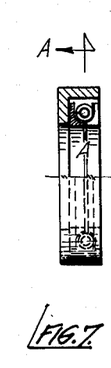
FIG. 7 is a side elevation, partly in section, of the ring assembly of FIG. 6.

*Seals rings.*—A pair of inwardly expanding stationary seal rings 29, 29' as shown in FIG. 2, and shown enlarged in FIGS. 6 and 7, are seated within the smaller cylinder bore of the respective cylinders 21, 21', where each seal ring 31 is split into segments provided with a groove accommodating a tension coil spring 30, having its ends hooked together while an outer spacer 29 is employed to keep the ring-parts properly positioned. A definite advantage of this arrangement is obvious: These segments can be readily exchanged (when the respective cylinder is moved outward a bit) without dismantling the whole.

On end of each stationary holder 35, 35' are arranged seal rings 37, 37' used to seal-off the pass-over tubes to ensure the needed efficiency of operation; the back and forth moving ports 46, 46' of the pass-over tubes (their location considered in relation to stationary contracting seal rings) when on combustion side, can cause a leak from the scavenging side to combustion side; and when said ports are on the wobble-mechanism side, there also is possible a leak from the scavenging side to the wobble-mechanism housing. In the arrangement according to invention, those possible leaks are fully prevented by stationary seals 37, 37', located inside of pass-over tubes in about the same position as are the rings 29, 29' described before and located outside of pass-over tube in small diameter bore.

As seen in FIG. 2, the holders 35, 35' can be easily taken out for servicing of rings 37, 37'. Each piston 22, 22' is sealed with respect to the related cylinders with standard piston rings 23, 23', in addition to those described previously; all said rings are cooperating to seal off the combustion side from the scavenging side and also sealing off said sides of piston from the wobble-mechanism housing all the time.

The working of the scavenging exchange: Considering the right side of engine of FIG. 2 or FIG. 8, with the piston-spool on its extreme left on the end of suction stroke, the inlet ports 47 are exposed and the suction air rapidly enters the scavenging space, as the previous stroke created a vacuum therein; next stroke to right precompresses the enclosed air, as the inlet passages 47 are covered quickly by the returning piston-spool. When the piston reaches almost its right dead center location, ports 46 in pass-over tube are made free and coinciding with inlet passages 43 and 45 into combustion space and into combustion chamber thru which the precompressed scavenging air enters the combustion space, expels the exhaust gases thru already exposed exhaust ports 48 and fills-up completely said combustion chamber and combustion space.

In the arrangement of the present invention, there is obtained a truly uniflow scavenging, provided by the rear side of a large diameter piston working in a cylinder, having an effective area considerably larger than is the combustion area in the same cylinder, and this arrangement operates with approximately 1.15 times excess volume of scavenging air (with respect to combustion space) because the diameter-area of the scavenging side is larger than the differential of the two piston portion diameter-areas on the combustion side. Also, because the engine is crankless on the scavenging side as shown in FIG. 2 and 8, and because the contour of the closing lid can closely follow the shape of piston, the arrangement of the invention gives the best volumetric efficiency of scavenging as the precompression ratio on the scavenging side is high, so that the air can be precompressed to higher pressure of about 12 p.s.i., enabling maximum cleaning of the residual gases from the combustion chamber and the combustion space and complete filling of same with fresh air.

*The working of the whole engine.*—As seen in FIG. 2, expanded gases after combustion escape thru port 48' around the front of the left-hand piston 22' while a simultaneous scavenging stroke (in back of right-hand piston) within the right-hand cylinder causes free air movement from a central air-filter into a right-hand compartment 41 formed by the piston displacement. Compartments 40 and 40' formed between the respective pistons and cylinders are active combustion spaces, where the high temperature compression and combustion take place, while the scavenging compartments 41 and 41' on the back side of the respective pistons (between pistons and lids) are provided for precompressing of air for scavenging.

Fresh air is introduced as the piston-spool is reciprocating, through suction manifold to space 41 or 41' and when it is later pre-compressed, it "passes-over" into the respective combustion chamber 40, 40' as apertures 46, 46' become exposed at the time the associate part of small diameter piston portion is withdrawn from the small diameter portion of the respective cylinder.

The part 22' of the piston-spool on the left side of FIG. 2 is shown at its location during the interval when the combustion stroke has just been completed and the exhaust gases escape into the exhaust thru port 48'. They are pushed out by the scavenging air which was compressed in the left side space 41'. At the same time, on the right side of the engine, the fuel-air mixture needed for combustion is already compressed and ignited and the scavenging air is simultaneously sucked-in thru the port 47. On the return stroke, the cycle is repeated in reverse manner.

It will be evident, that the combustion at one side of the engine produces sufficient force to precompress the scavenging air on the same side and also to directly compress the air needed for combustion on the other side and to provide for escape of exhaust gases thru 48 into the muffler or receiver, whichever it may be. For each complete revolution of the main shaft, there are two combustion strokes.

*Description of the tandem engine shown in FIGS. 8 and 9.*—The basic engine described in FIGS. 1 and 2 can be further developed into units built in tandem with two, four or eight piston-spools as shown in following figures:

FIGS. 8 and 9 show tandem engine with two spools in line;

FIG. 10 shows a tandem arrangement with four spools in V-form and

FIG. 11 shows a tandem arrangement with eight spools in a barrel form.

FIG. 8 with its front view in FIG. 9 consists of two engines as described in FIG. 2 arranged in tandem (one behind the other) acting on common main shaft, where the wobbling arms are timed 180° apart so they work oppositely. In this case both wobbling arms have rigid wobbling studs 11, 111 which engage into the piston-spools, providing perfectly balanced unit.

Inner cylinders 21' and 121 must be set at least one inch apart, so the inwardly acting piston segments can be replaced easily when respective cylinder is moved axially out.

*Piston-spool positioning device.*—While the stroke of piston-spool rendered by the wobbling mechanism is constant at all times, it is needed to adjust the location of piston-spool in relation to cylinders, to obtain same compressions on both sides of spool. In order to be able to set the wobbling mechanism into proper location for equal compression ratio on both spools, a position adjusting device of same is arranged in this type of engine with adjustable thrust bearing located on the main shaft midway between the wobble-mechanisms, so that heat-elongation should have no ill-effect on the setting. (See FIG. 8.)

Figure 16:
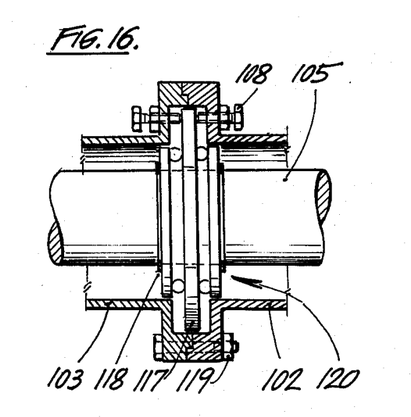

As shown in enlarged FIG. 16, a double thrust bearing 117 is secured on main shaft 105 by retaining rings 118, and the central part of the bearing with its larger diameter is accommodated in space formed by the two rigid flanged tubular housings 102 and 103, which are firmly bolted together thru bolts 119. At least two set screws 108 have to be provided on each side equally spaced, for accurate axial adjustment of the wobble-mechanism units with piston-spools, including the main shaft, when checking the location of the edge of the front and rear pistons, measured from the machined cylinder-flange when lids 34, and 134' are off.

It is noted, that lengthwise adjustable individual hubs 6, 106 of wobbling-mechanisms would produce even better effect, as adjustments could be made more accurately for each spool.

For complete description of FIG. 8, note that a chain drive for the injection pump 74 close to the flywheel is provided, which consists of a driving sprocket 19a, driven sprocket 19b arranged on extended injection pump drive shaft 75, a tensioning sprocket 19c and a roller chain 20, all enclosed in a housing separated from 81 for proper lubrication of the chain drive. The clutch-housing 81 is serving as an enclosure for the flywheel 83 and the starter 84; to this housing a transmission 85 can also be attached.

In the front engine-housing 1, there is provided a helical gearing 17, which transmits rotation to a vertical shaft 18, on top end of which a distributor 73 is set and on the bottom a lubrication oil pump 67, serving the front and the rear unit; for that purpose an interconnecting oil-line 72 between the wobbling mechanism housings is to be provided.

The main shaft is extended further forward into tubular housing 2 and supported in a needle bearing 39; next to it there are arranged two V-belt drives: one set 88 is to drive the generator 87 and the other 92 to drive the cooling fan 90, which revolves on extended shaft arranged in supporting bracket 91. A stationary vane-ring 89 with fins is arranged in front of fan on circular tapered stationary housing 93 which covers the whole engine for the purpose of diverting the cooling air to hottest areas of cylinders. Deflectors, identified by 94 also serve said purpose.

*Suction air-filter.*—Clean air is to be supplied to cylinders thru suction manifold 62 and 162; for that purpose air-filters 61, 161 are arranged on top of engine, each air filter unit (front one described) consists of a tubular horizontal hollow body, into which are set exchangeable filter-cartridges 64 to draw air from outer ends; the middle cylindrical part is extended below into compartment 63, made in a unit with the suction manifold 62, and the whole is flanged to a couple of cylinders 21, 21'.

*Lubrication.*—A circulating lubrication of the engine is considered as best suitable in this particular engine; the main object being, to prevent oil-mist from entering the combustion space in order to keep spark-plugs serviceable as long as possible.

*Exhaust.*—An exhaust manifold 95, 195 is shown on the bottom of FIG. 8 which brings the exhaust gases from the four exhaust ports to common receiver 96; the whole system is of a chambered type with repeated expansions and compressions in nonharmonic cycles, into a continuous flow of exhaust fumes. This is done thru a number of tapered round sections of unequal lengths joined together and producing said effect; this novel chambered exhaust silencer can be applied to any internal combustion engine.

The engine of FIG. 8 described above, works similarly to the one already disclosed in FIG. 2, except that it is perfectly counterbalanced not only mechanically, but also in working cycles. It is pointed out that each work-producing stroke is in duplicate, which means that we get more positive run at idling speed; in case one firing would miss, the other keeps the engine still running, which is a definite advantage in this set-up.

Utmost care was also exerted to provide a positively working fuel-injection system, as it is well known fact that twice as many injections are needed in a two-cycle engine as in a four-cycle one. A fool-proof, dual-duty (or in other words "hybrid") injection pump with operating means was developed, working on 4-cycle principle at low speeds and on 2-cycle at all higher speeds to provide correct mixture of air and fuel thruout; all this is covered in a separate patent application SN #239,398 of Nov. 19, 1962.

*Wobbling studs mounted in swiveling clevises.*—They are used in V-type and in barrel arrangements, to prevent binding in wobble mechanism and so to render easy movements.

The piston-spool engine actuated by a wobble-mechanism can be developed into a V-form with two banks of cylinders I and II inclined 90° as shown in FIG. 10. There, on each wobble-arm extension, one stud 111–II is rigid, the other 111–I swiveling on clevis 115 in certain limits (see FIG. 13); it is a known feature of wobble-mechanics, that wobbling studs rigidly arranged 90° apart, when reciprocating, one stud can not keep straight line of motion, which deviation is however small; therefore one clevis-mount is needed, to keep the other rigid stud moving in straight line.

It has to be noted, that clevises are also badly needed to meet inaccuracies of production; for instance, in V-engine, to fit two rigid wobble-arms in piston-spools and to make them wobbling around center of main shaft would be a real task; so with one stud on clevis as on FIG. 13, then it is easy to assemble things and run them without any tendency for binding.

In case of an engine developed into a barrel form as shown in FIG. 11, for instance in four banks I, II, III and IV spaced 90°, each wobble-hub must have two opposite wobbling arms with radially extended studs II and IV rigid, and the side-ones I and III swiveling in clevises 115 as shown in FIG. 12, which swivel a trifle on a pin 116 arranged in wobbling-hub housing, split into two halves 110a and 110b, to enable assembly and held together thru a multiple of bolts 112. These clevises take care of small deviations of one set of studs from the straight line.

The novel principle of piston-spool engine wobble-arm actuated as herewith disclosed can be worked out easily also as a diesel engine.

Unit described can work as a torque-producing engine on an output shaft or as a true free-piston engine producing exhaust gases to drive a turbine. The same principle can also be developed for use on tractor trailers, where rear wheels of tractor are driven in ordinary torque-transmitting manner, while the trailer-axles are driven by a reversible exhaust gas turbine supplied with exhaust gases from the main internal combustion engine.

Various modifications may obviously be made on illustrated and particularly described embodiments, without departing from the true spirit and scope of the invention which I intend to have defined by the appended claims taken with all reasonable equivalents.

I claim:
1. In an internal combustion engine having a main shaft and a pair of cylinder blocks with axially aligned cylinders, inlet and outlet ports in each cylinder intermediate the ends thereof, and pass-over passages communicating from a groove in each small diameter bore with the respective cylinder, an engine housing interconnecting said cylinder blocks and having a bore interconnecting said cylinders for receiving pass-over tubes, a piston-spool extending with one piston into each cylinder, each piston consisting of a large diameter piston part and a small diameter pass-over tube and being hollow and having such an extension as to close one of said ports and clear the other one when it is at one end of its stroke, inwardly acting seal rings between said housing and pass-over tube, a coupler connecting said pistons through their pass-over tubes, ports in the two sides of each pass-over tube, said ports being so located as to open into the cylinder when the piston is at one end of its stroke, said pistons and ports controlling the admission and exhaust to and from said cylinders, and wobble means connecting said piston-spool through a universal joint with the engine main shaft, an air-tight cylinder closing lid fastened to the outer end of each cylinder and reaching far into the cylinder, following closely the inner contour of the hollow reciprocating piston part, and ended inside the piston part with a small flanged opening, a stationary seal-ring holder secured in said opening and extending into the hollow reciprocating pass-over tube, seal-ring means for the inner bore of the pass-over tube being arranged on the end of the stationary holder in a location opposite said inwardly acting seal-rings, all acting together for sealing off the combustion side of the piston from the scavenging side thereof and also sealing off both said sides from the engine housing, a compact scavenging pump space, larger in its piston displacement than the piston displacement of the combustion space, being thereby created between the piston part and the cylinder closing lid and being sealed off from remaining spaces, the cylinder inlet ports being so disposed as to be exposed to the scavenging space by the piston part at the end of its suction stroke to draw in a volume of scavenging air in excess of the piston displacement volume of the combustion side, the ports in the pass-over tube being so disposed as to interconnect the scavenging side with the combustion side at the end of the succeeding stroke to permit the precompressed scavenging air to be passed-over into the combustion space, the precompression ratio of said scavenging pump space being such that the scavenging air is compressed between the piston and the lid during such succeeding stroke to at least 12 p.s.i.

2. In the engine as defined in claim 1, the exhaust ports being exposed, through the reciprocating motion of the piston, at the end of said succeeding stroke, a compact and turbulent combustion chamber of an egg form located in each cylinder block close to the pass-over tube bore and on the combustion side of the piston part, said chamber having a radially extending tangential inlet passage coinciding at the end of said succeeding stroke with said pass-over tube ports, adjacent outlet passages located apart in the combustion chamber wall communicating with the cylinder combustion space, said ports and passages directing part of the inrushing air from the pass-over tube into the combustion chamber to form loops in spiral form therein, to drive out fully all residual gases and fill up same with fresh scavenging air.

References Cited by the Examiner

UNITED STATES PATENTS

| | | | |
|---|---|---|---|
| 1,440,825 | 1/23 | Guaita | 123—62 |
| 1,503,370 | 7/24 | Martin | 123—59.51 |
| 1,900,133 | 3/33 | Schaeffers | 123—57 |
| 1,905,062 | 4/33 | Schaeffers | 123—57 |
| 2,010,170 | 8/35 | Winfield | 123—74 |
| 2,043,080 | 6/36 | Vincent | 123—32.2 |
| 2,258,127 | 10/41 | Almen | 123—58 |
| 2,722,924 | 11/55 | Hedges | 123—59 |
| 2,765,616 | 10/56 | Cockerell | 123—58 |
| 2,780,208 | 2/57 | Brown | 123—61 |

FRED E. ENGELTHALER, *Primary Examiner.*
RICHARD B. WILKINSON, *Examiner.*